United States Patent Office 2,879,228
Patented Mar. 24, 1959

2,879,228
PROCESS FOR PURIFYING CRUDE PERFLUOROCARBONS

Robert E. Holeton, Woodstown, N.J., assignor to the United States of America as represented by the United States Atomic Energy Commission No Drawing. Application April 16, 1946
Serial No. 662,601

1 Claim. (Cl. 208—310)

This invention relates to the refining of organic fluorides.

In the manufacture of perfluorinated compounds by the fluorination of hydrocarbons or partially fluorinated hydrocarbons, perfluorinated products are obtained which as a general rule are contaminated by hydrogen-containing impurities. Some of these impurities are relatively unstable and their presence in the product renders it unfit for certain uses.

An object of the invention is to reduce the hydrofluorocarbon content of impure perfluorinated compounds. A further object of the invention is to provide fluorinated products which are highly stable to oxidizing media such as uranium hexafluoride. Further objects will appear from the following description of the invention and specific illustrations of its application.

In accordance with the present invention, a fluorocarbon which contains a hydrofluorocarbon impurity is contacted in fluid condition with an active adsorbent. Suitable adsorbents for the purposes of the invention are active silica gel and alumina gel.

The process is applicable to the treatment of fluorinated compounds such as fluorolubricants obtained by the liquid phase or vapor phase fluorination of lubricating oils and fluorocarbons such as perfluorodimethylcyclohexane or perfluoroheptane obtained by the fluorination of hexafluoroxylene or heptane. Products of these types are obtained by treating the initial materials with cobalt trifluoride, silver difluoride, or manganese trifluoride at elevated temperatures (200° C. to 500° C.). The fluorination products are normally contaminated with small quantities of intermediate fluorination products containing hydrogen. While some products containing one or two atoms of hydrogen in the molecule are stable to the action of uranium hexafluoride and similar oxidizing agents, other hydrogen-containing intermediates are rather reactive with this reagent and those containing substantial proportions of hydrogen are violently reactive. The process of this invention is capable of removing both stable and unstable hydrofluorocarbons.

The refining treatment of the present invention may be carried out at normal or elevated temperatures. The adsorption proceeds more rapidly at elevated temperatures and in the case of some perfluorinated products, the viscosity at normal temperatures may be so high as to prevent satisfactory purification of the product in undiluted form without employing elevated temperatures. In the treatment of perfluorolubricants obtained by the fluorination of high-boiling lubricating oil fractions of petroleum, temperatures between 100° C. and 250° C. have been found to be most effective.

The following examples further illustrate the nature and application of the invention. Unless otherwise indicated, proportions are in terms of weight.

Example I

A fluorinated lubricant, distilling in the range of about 140° C. at 10 mm. to about 200° C. at 10 mm. of mercury absolute pressure and obtained by the fluorination of a lubricating oil fraction derived from petroleum, formed, upon treatment with uranium hexafluoride, 3.85% of its weight of non-volatile residue. Separate samples of this product were treated with various proportions of silica gel at temperatures between 135° C. and 240° C. for periods from one to twenty-four hours. The proportion of silica gel employed, the treatment temperature and time, and the stability of the resulting product in terms of non-volatile residue formed by treatment with uranium hexafluoride are indicated in the following tabulation.

| Silica Gel—Fluorocarbon | Temp., °C. | Time (hrs.) | Stability (Residue), percent |
|---|---|---|---|
| 5% | 135 | 1 | 2.8 |
| 10% | 135 | 1 | 1.6 |
| 10% | 135 | 3 | 1.3 |
| 10% | 180 | 1 | 1.0 |
| 10% | 180 | 3 | 0.64 |
| 10% | 240 | 1 | 0.61 |
| 20% | 135 | 1 | 1.2 |
| 20% | 135 | 3 | 0.7 |
| 20% | 135 | 24 | 0.24 |
| 20% | 240 | 1 | 0.3 |

Example II

In this example a sample of perfluorodimethylcyclohexane containing monohydro derivatives was treated at room temperature for successive periods with alumina gel and the proportion of monohydro compounds present as determined by the specific inductive capacities of the products was determined after each treatment. In each treatment, two parts of perfluorodimethylcyclohexane was treated with one part of fresh alumina gel. The proportion of monohydro compounds in the initial material was 32%. After a first treatment for 24 hours at room temperature the monohydro content was 24%. After a second treatment for 24 hours, the monohydro content was 17%. After a third treatment for 40 hours it was 14%; after a fourth treatment for 96 hours, 10%; and after a fifth treatment for 48 hours, 7%.

Thus it is evident that even at room temperatures the adsorption of the hydrogen-containing impurities takes place to a substantial degree.

It will be understood that I intend to include variations and modifications of the invention and that the preceding examples are illustrations only and in no wise to be construed as limitations upon the invention, the scope of which is defined in the appended claim, wherein I claim:

The method of refining a crude perfluorinated lubricating oil which contains incompletely fluorinated oils dissolved therein, which distills in the range between 140° C. and 200° C. at 10 mm. of mercury absolute pressure and which is made by the fluorination of a lubricating oil fraction derived from petroleum, in order to reduce its content of incompletely fluorinated oils that are reactive with uranium hexafluoride, which comprises bringing said crude perfluorinated lubricating oil into intimate liquid phase contact with at least 5% of its weight of active silica gel for a period of at least one hour at a temperature between 100° C. and 250° C., and then separating the refined perfluorinated lubricating oil from the silica gel containing incompletely fluorinated oils adsorbed thereupon.

References Cited in the file of this patent

UNITED STATES PATENTS

| | | |
|---|---|---|
| 1,678,298 | Patrick | July 24, 1928 |
| 2,121,992 | Sterba | June 28, 1938 |
| 2,123,785 | Knox et al. | July 12, 1938 |
| 2,132,349 | Booth | Oct. 4, 1938 |
| 2,316,499 | Borglin | Apr. 13, 1943 |